(12) United States Patent
Higuchi et al.

(10) Patent No.: US 6,307,711 B1
(45) Date of Patent: Oct. 23, 2001

(54) DISC CARTRIDGE

(75) Inventors: Shintaro Higuchi; Hiroshi Meguro, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/398,056

(22) Filed: Sep. 17, 1999

(30) Foreign Application Priority Data

Sep. 22, 1998 (JP) .................................................. 10-268690

(51) Int. Cl.$^7$ ................................................... G11B 23/03
(52) U.S. Cl. ........................................... 360/133; 369/291
(58) Field of Search ............................. 360/133; 369/291, 369/77.2, 289

(56) References Cited

U.S. PATENT DOCUMENTS

| | | | |
|---|---|---|---|
| 4,714,973 | 12/1987 | Kato et al. | 360/133 |
| 4,849,844 | 7/1989 | Kato | 360/133 |
| 4,853,925 | 8/1989 | Kaneuchi | 369/291 |
| 5,005,092 | 4/1991 | Shigenai et al. | 360/99.06 |
| 6,014,294 * | 1/2000 | Fujisawa | 360/133 |

FOREIGN PATENT DOCUMENTS

| | | |
|---|---|---|
| 0 301 811 | 2/1989 | (EP) . |
| 0 353 000 | 1/1990 | (EP) . |

* cited by examiner

Primary Examiner—Hoa T. Nguyen
Assistant Examiner—Angel Castro
(74) Attorney, Agent, or Firm—Sonnenschein, Nath & Rosenthal

(57) ABSTRACT

A disc cartridge mounted for movement on a main cartridge body unit housing a magnetic disc, in which the disc cartridge has a shutter member of a U-shaped cross-section for opening/closing a recording/reproducing aperture provided in the main cartridge body unit. The shutter member is provided with first and second guide pieces engaging in the movement guide groove provided in the main cartridge body unit. On a lateral side of the main cartridge body unit 4, there are formed first and second inclined guide portions for guiding in the movement guide groove the first and second pieces provided in the shutter member. One of the first and second guide pieces is of a height larger than the other guide piece so that, when the shutter member is mounted on the main cartridge body unit, the guide pieces are prevented from being abutted against the lateral side of the main cartridge body unit to suppress generation of chips from the main cartridge body unit.

5 Claims, 9 Drawing Sheets

DISC CARTRIDGE

BACKGROUND OF THE INVENTION

1. Field of the Invention

This invention relates to a disc cartridge having a shutter member for opening/closing a recording and/or reproducing aperture formed in a main cartridge body unit rotationally housing a disc-shaped recording medium, such as a magnetic disc.

2. Description of the Related Art

Heretofore, there is employed a disc cartridge comprised of a main cartridge body unit, made up of upper and lower cartridge halves, abutted and connected to each other, and a magnetic disc rotationally housed therein, in which the main cartridge body unit has a recording and/or reproducing aperture for exposing at least a portion of the signal recording region of the magnetic disc housed in the main cartridge body unit to outside along the radius of the disc.

This type of the disc cartridge is provided with a shutter member formed by warping a thin metal sheet and which is adapted for opening/closing a recording and/or reproducing aperture provided in the main cartridge body unit. This shutter member has a pair of shutter portions for opening/closing the recording and/or reproducing apertures formed in the upper and lower surfaces of the main cartridge body unit, and a connecting piece interconnecting these shutter portions. The shutter member is U-shaped in cross-section and is attached to the main cartridge body unit by being fitted on a lateral side of the main cartridge body unit.

The shutter member, attached to the main cartridge body unit, has a guide piece engaging in a movement guide groove formed in the upper or lower surface of the main cartridge body unit. This guide piece, engaged in the movement guide groove formed in the upper surface or in the lower surface of the main cartridge body unit, is formed by vertically segmenting a portion of the shutter portion. The shutter member is mounted on the main cartridge body unit, in a manner free from extrication from the main cartridge body unit, by having the guide piece engaged in the movement guide groove. Also, the shutter member is moved by the guide piece being guided along the movement guide groove so that the shutter member is supported on the main cartridge body unit for movement in a direction of opening/closing the recording and/or reproducing aperture along a lateral surface of the main cartridge body unit.

Meanwhile, the shutter member is configured so that, when the shutter member adapted for opening/closing the recording and/or reproducing aperture is mounted on the main cartridge body unit, it can moved along the upper and lower surfaces of the main cartridge body unit without being protruded from the upper and lower surfaces of the main cartridge body unit. That is, the shutter member is configured to have the above-mentioned U-shaped cross-section, with the interval between the facing shutter portions being approximately equal to or slightly smaller than the thickness of the main cartridge body unit.

The movement guide groove, formed in the upper surface or in the lower surface of the main cartridge body unit, is formed by having a portion of the upper or lower surface of the main cartridge body unit swollen inwards. Therefore, the movement guide groove is formed for extending at a site offset from the magnetic disc housing section along the lateral side of the main cartridge body unit along which the shutter member is moved. The purpose of providing the movement guide groove is to narrow the space within which to accommodate the magnetic disc to prevent obstruction of magnetic disc rotation in the main cartridge body unit.

Therefore, the guide piece engaged in the movement guide groove is formed on the connecting portion of the shutter member to the connecting piece corresponding to the proximal end o the shutter member. Since the guide piece is used to prevent extrication of the shutter member from the main cartridge body unit, it is of a height sufficient to prevent the guide piece from being detached easily from the movement guide groove when the guide piece is engaged in the groove.

If the shutter member of the U-shaped cross-section, with a thickness substantially equal to the thickness of the main cartridge body unit and a height sufficient to prevent the guide piece from being detached easily from the movement guide groove, is to be mounted on the main cartridge body unit, the portion of the shutter member carrying the guide piece is thrust open and flexed such as to reduce the thickness of the lateral side of the main cartridge body unit carrying the shutter member.

However, if the proximal end side of the shutter member carrying the guide piece is extended open excessively, the shutter portion extended from the connecting piece is deformed, as a result of which the shutter portions are floated from the upper or lower surfaces of the main cartridge body unit to render it impossible to reliably open or close the recording and/or reproducing aperture when the shutter member is attached to the main cartridge body unit.

In a lateral side of the main cartridge body unit carrying the shutter member, there is formed a gap via which a torsion coil spring for biasing a shutter member mounted on the main cartridge body unit in the direction of closing the recording and/or reproducing aperture is inserted into the main cartridge body unit. The portion of the gap can be easily flexed and deformed, however, the remaining portions of the main cartridge body unit cannot be flexed and deformed easily because of the abutting upstanding wall sections of the upper and lower cartridge halves making up the main cartridge body unit.

The plural guide pieces of the shutter member are provided at large distances on both sides of the movement direction of the shutter member to permit stable movement of the shutter member along the lateral side of the main cartridge body unit. Thus, when mounting the shutter member on the main cartridge body unit, the totality of the guide pieces cannot be caused to face the portions of the main cartridge body unit that can be flexed and deformed easily. The result is that, when the shutter member is attached to the main cartridge body unit, one or more guide pieces are caused to face the readily flexible portions of the main cartridge body unit, as a result of which the guide pieces and the lateral surface of the main cartridge body unit are overlapped to render it difficult for the guide pieces to be engaged in the movement guide groove. If, as the guide pieces are overlapped with the lateral surface of the main cartridge body unit, the shutter member is thrust into the main cartridge body unit so that the guide pieces will be engaged in the movement guide grooves, the guide pieces or the shutter portion carrying the guide pieces are flexed and deformed into engagement in the movement guide grooves. However, this scrapes off a portion of the main cartridge body unit to produce chips, while damaging and impairing the appearance of the main cartridge body unit. Moreover, if chips produced from the main cartridge body unit are affixed to the magnetic disc, dropout of information signals occurs frequently when recording and/or reproducing the information signals. In addition, the guide pieces or the shutter portions formed with the guide pieces are flexed severely, while the shutter member itself is deformed to render it impossible to reliably close the recording and/or reproducing aperture in the main cartridge body unit.

SUMMARY OF THE INVENTION

It is therefore an object of the present invention to provide a disc cartridge in which a shutter member carrying guide pieces engaged in movement guide grooves provided in a main cartridge body unit can be easily mounted on the main cartridge body unit.

It is another object of the present invention to provide a disc cartridge in which there is only little risk of damaging the shutter member or the main cartridge body unit and in which the shutter member can be mounted on the main cartridge body unit as a disc-shaped recording medium housed in the main cartridge body unit is protected reliably.

It is yet another object of the present invention to provide a disc cartridge in which the shutter member mounted on the main cartridge body unit is prevented from being detached easily from the main cartridge body unit and moreover can be moved in stability.

The present invention provides a disc cartridge for rotationally housing a disc-shaped recording medium as an information recording medium including a disc-shaped recording medium, and a main cartridge body unit including an upper cartridge half and a lower cartridge half rotationally housing the disc-shaped recording medium. The main cartridge body unit includes a recording and/or reproducing aperture in at least the upper surface or the lower surface thereof for exposing at least a portion of the disc-shaped recording medium to outside along the radial direction of the disc-shaped recording medium. The disc cartridge of the present invention also includes a shutter member having a shutter portion for opening/closing the recording and/or reproducing aperture. The shutter member is mounted on the main cartridge body unit for movement along a lateral side of the main cartridge body unit. The shutter member has at least a first guide piece and a second guide piece, as a pair, for engagement in movement guide grooves formed in the upper or lower surface of the main cartridge body unit for extending along the direction of movement of the shutter member. There are formed a first inclined guide portion and a second inclined guide portion on a lateral side of the main cartridge body unit for guiding the first guide piece and the second guide piece into engagement with the movement guide groove. The first inclined guide portion or the second inclined guide portion are higher in height than the first or second guide piece facing the first inclined guide portion or the second inclined guide portion, respectively.

The first inclined guide portion and the second inclined guide portion are preferably formed for extending from a lateral side of the main cartridge body unit to one side of the movement guide groove or to the vicinity thereof with different angles of inclination, with the first or second inclined guide portion having a larger angle of inclination than that of the second or first inclined guide portion being of a height larger than the second or first guide piece facing the second or first guide piece, respectively.

There is preferably provided a gap between the portions of the upper and lower cartridge halves formed with the first or second inclined guide portion having an angle of inclination smaller than the second or first inclined guide portion on one lateral side of the main cartridge body unit.

The side of the first or second inclined guide portion having a larger inclination angle than the second or first inclined guide portion, facing the second or the first inclined guide portion, preferably has a height lower than the other side thereof.

The first and guide pieces are protuberantly formed laterally of the movement direction of the shutter portion and are preferably formed on the first and second cartridge holding portions fitted on the lateral side of the main cartridge body unit.

DESCRIPTION OF THE PREFERRED EMBODIMENTS

Figure 1:
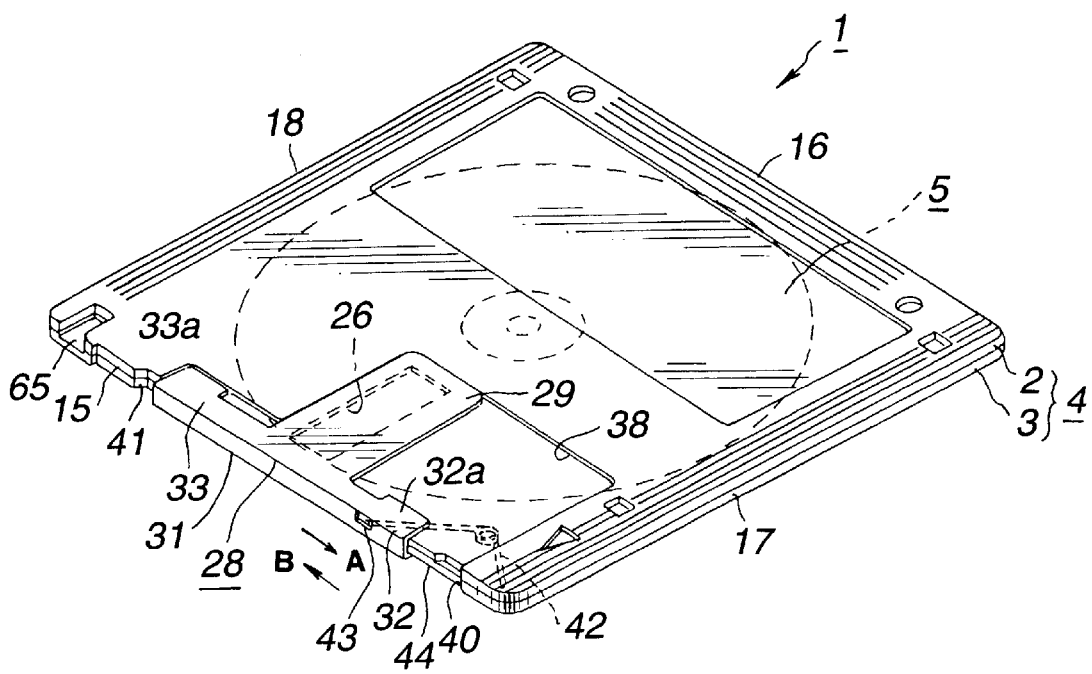
FIG. 1 is a perspective view showing a disc cartridge according to the present invention from above.

Referring to the drawings, the present invention is explained taking, as an example, a disc cartridge accommodating a magnetic disc as a disc-shaped recording medium.

Figure 2:
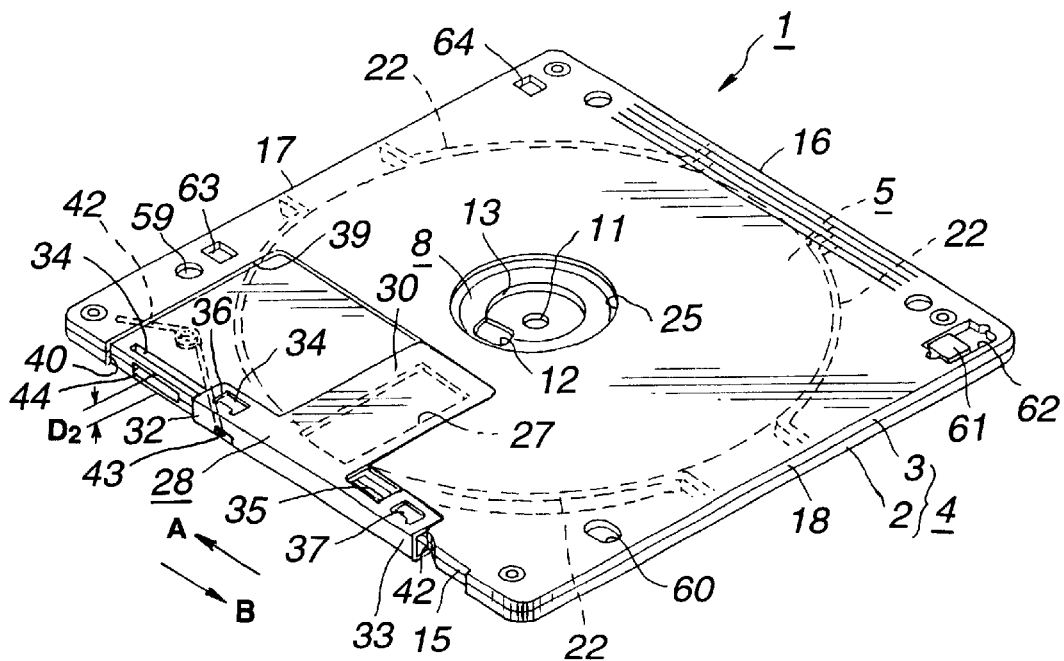
FIG. 2 is a perspective view showing a disc cartridge according to the present invention from below.
Figure 3:
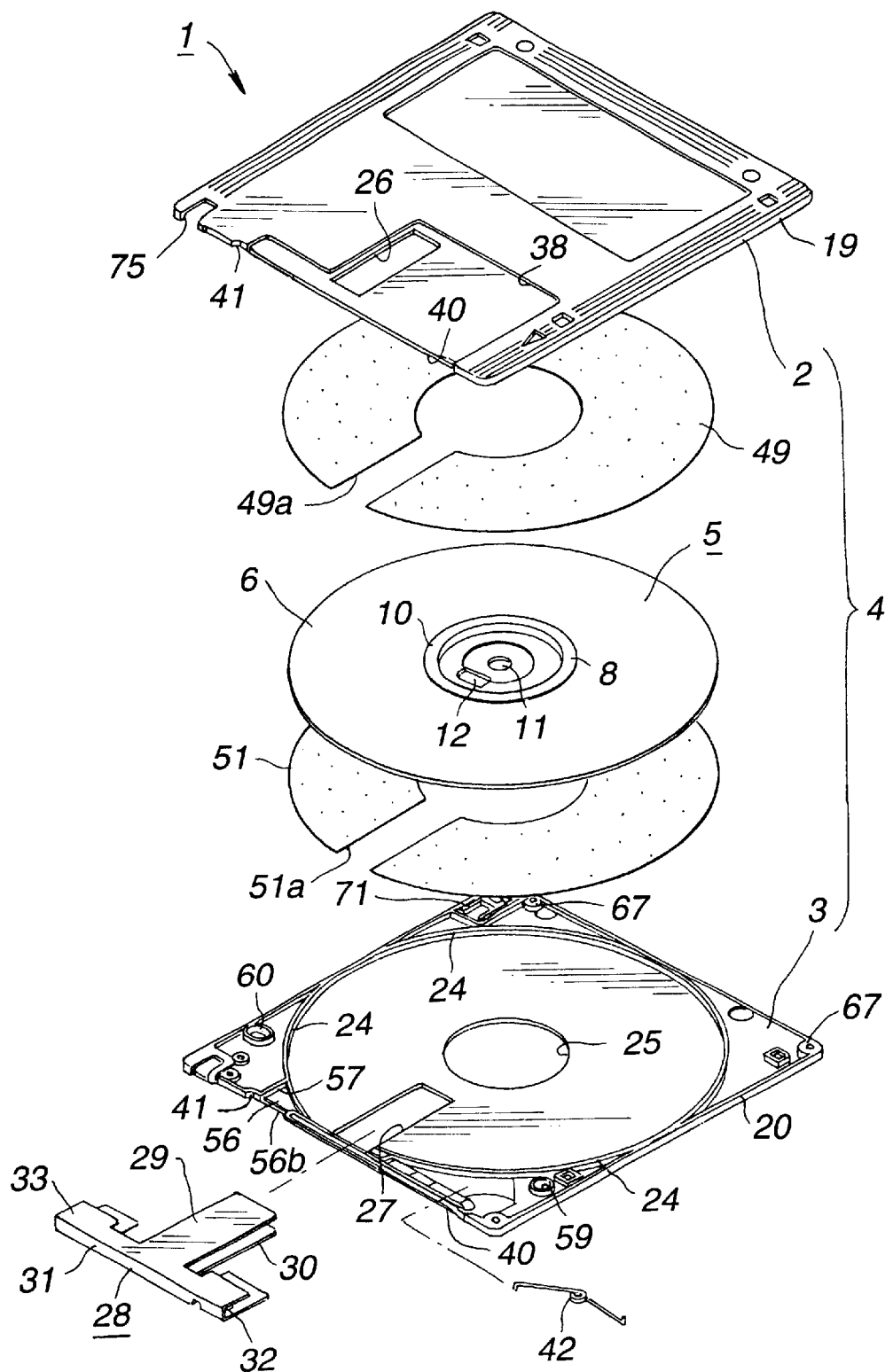
FIG. 3 is an exploded perspective view of the disc cartridge.

Referring to FIGS. 1 to 3, a disc cartridge 1 of the present invention includes a main cartridge body unit 4, made up of a substantially rectangular upper cartridge half 2 and a substantially rectangular lower cartridge half 3, abutted and connected to each other, and a magnetic disc 5, as a recording medium for information signals, housed within the main cartridge body unit 4. The upper and lower cartridge halves 2, 3 are formed by injection molding a synthetic resin, such as acrylonitrile butyl styrene (ABS) resin.

Figure 4:
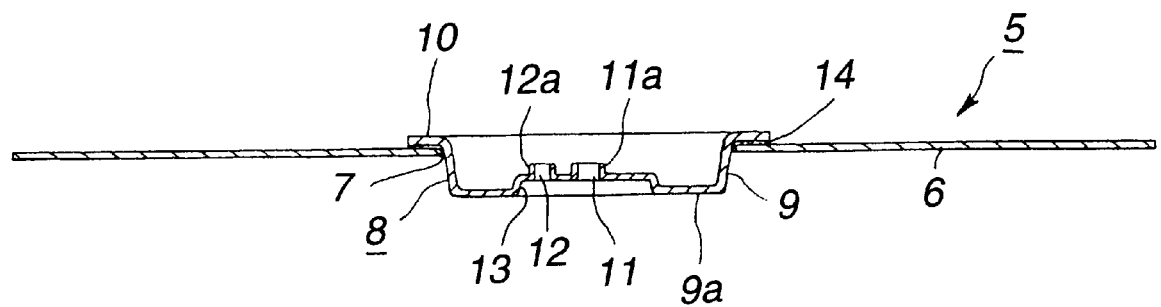
FIG. 4 is a cross-sectional view showing a magnetic disc housed in a disc cartridge according to the present invention.

The magnetic disc 5, housed within the main cartridge body unit 4, has a main disc member 6, approximately 3.5 inch in diameter, having a flexible thin film of synthetic resin, on each side of which is deposited a magnetic layer, as shown in FIG. 3. The center portion of the main disc member 6 has an opening 7, as shown in FIG. 4, and a center core 8 is mounted on the main disc member 6 by being fitted in the center opening 7. The center core 8 is formed of a magnetic material, such as metal, and is magnetically attracted by a magnet provided on a disc rotating driving unit arranged on a disc recording/reproducing apparatus, when the magnetic disc 5 is loaded on the disc rotating driving unit, for clamping the magnetic disc 5 on the disc rotating driving unit. That is, the center core 8 constitutes a clamping unit for clamping the magnetic disc 5 on the disc rotating driving unit.

Referring to FIG. 4, the center core 8 has a flat tubular swollen-out portion 9 at its center, and a flange 10 operating as a mounting portion to the main disc member 6 is formed as one with the upper end of the swollen-out portion 9. In a bottom portion 9a of the swollen-out portion 9 are bored a spindle shaft inserting opening 11 engaged by a spindle shaft constituting the disc rotating driving unit and a driving pin engagement opening 12 engaged by a driving pin provided on the disc rotating driving unit. Around the spindle shaft inserting opening 11 and the driving pin engagement opening 12 are formed upstanding wall sections 11a, 12a. The upstanding wall sections 11a, 12a support the peripheral surfaces of the spindle shaft and the driving pin over broad surfaces to effect reliable engagement of the spindle shaft and the driving pin in the spindle shaft inserting opening 11 and the driving pin engagement opening 12, respectively.

In the bottom 9a of the swollen-out portion 9 is formed a disc setting portion 13 for a disc table of the disc rotating driving unit. The disc setting portion 13 is formed by providing the bottom 9a of the swollen-out portion 9 with a recess to prevent deviation of the loading position of the magnetic disc 5 with respect to the disc table.

The center core 8, constructed as described above, is arranged by fitting the swollen-out portion 9 in the center opening 7 of the main disc member 6 and by setting the flange 10 on one surface of the main disc member 6. The flange 10 is set on one surface of the main disc member 6 and the flange 10 is bonded to the main disc member 6 with an adhesive 14 for mounting the center core 8 in this state on the main disc member 6.

The magnetic disc 5, used here, has a recording capacity exceeding 100 MBytes, and is loaded on the disc rotating driving unit so as to be rotated at a rotational speed of 3000 rpm.

The main cartridge body unit 4, housing the disc 5, is constructed by abutting and interconnecting upper and lower cartridge halves 2, 3, as shown in FIGS. 1 to 3. On the outer perimeters of the upper and lower cartridge halves 2, 3, constituting the main cartridge body unit 4, upstanding wall sections 19, 20, abutted to one another to constitute a first sidewall section 15, a second sidewall section 16 opposite to the first sidewall section 15 and third and fourth sidewall sections 17, 18, interconnecting the first and second sidewall sections 15, 16, as shown in FIGS. 5 and 6.

Figure 5:
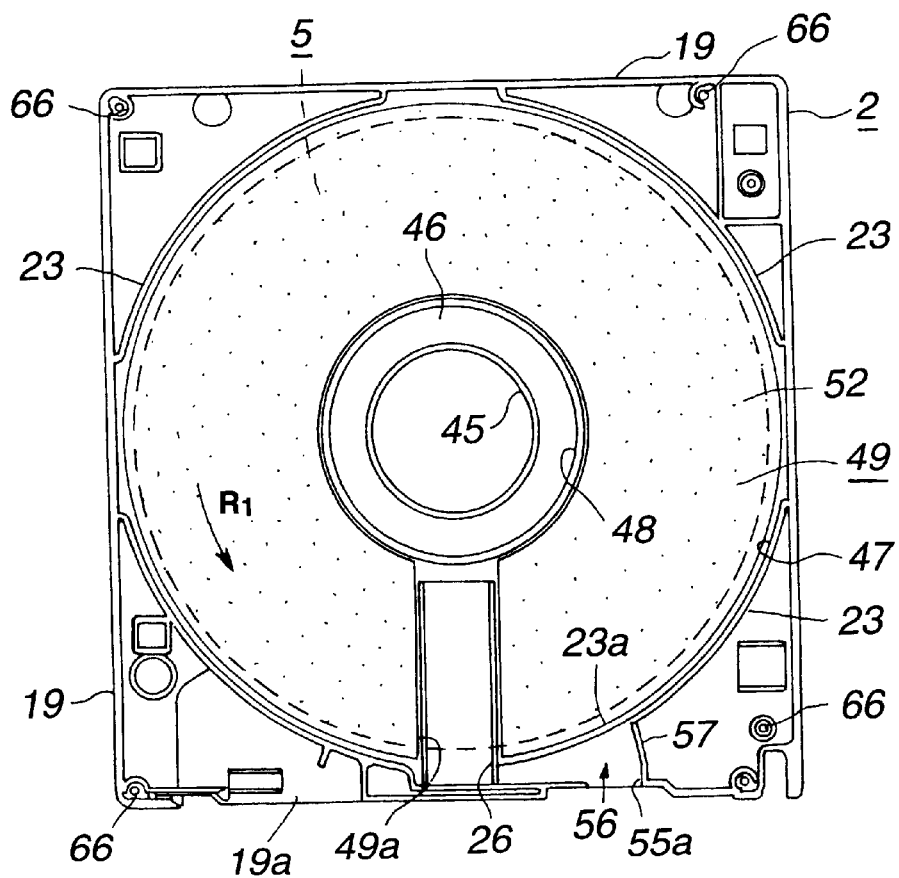
FIG. 5 is a plan view showing the inner surface of an upper cartridge half constituting the disc cartridge according to the present invention.
Figure 6:
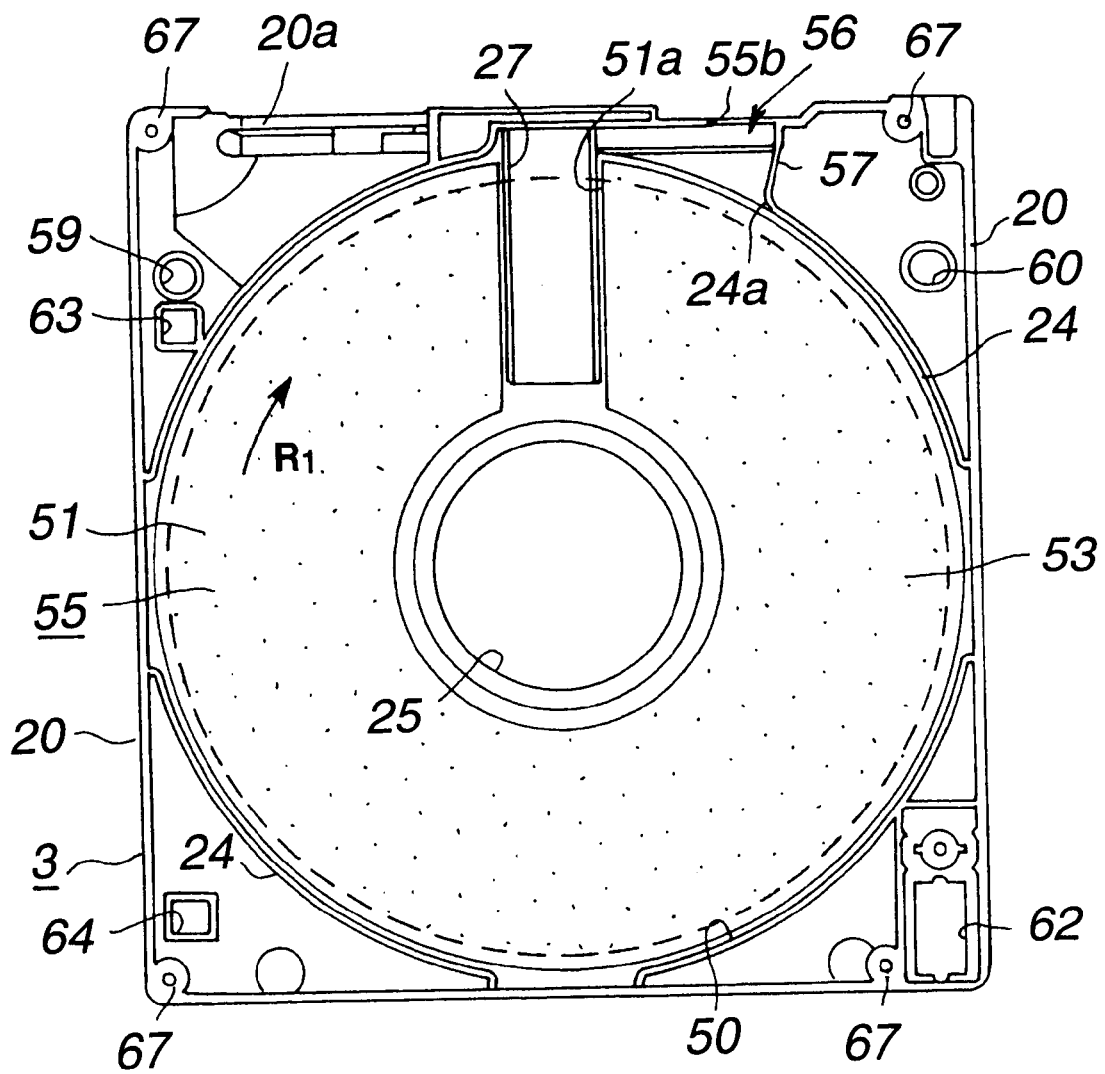
FIG. 6 is a plan view showing the inner surface of a lower cartridge half constituting the disc cartridge according to the present invention.
Figure 7:
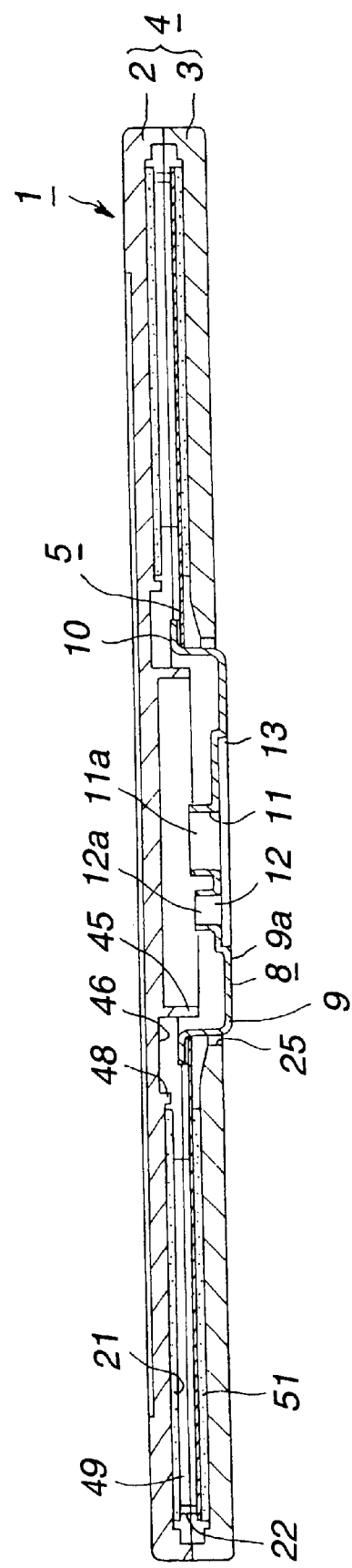
FIG. 7 is a cross-sectional view of the disc cartridge according to the present invention.

On the facing inner surfaces of the upper and lower cartridge halves 2, 3, there are formed upstanding partitioning wall forming wall sections 23, 24 for constituting a partitioning wall section 22 delimiting a disc housing section 21 adapted for rotatably housing the magnetic disc 5, as shown in FIGS. 5 and 6. These partitioning wall forming wall sections 23, 24 are formed as an arc inscribing the rectangular upper and lower cartridge halves 2, 3, as shown in FIGS. 5 and 6. The partitioning wall forming wall sections 23, 24 are abutted against each other to constitute the partitioning wall section 22, as shown in FIG. 7, with the area surrounded by the partitioning wall section 22 serving as the disc housing section 21. Since the partitioning wall section 22 constituting the disc housing section 21 is formed by abutting the partitioning wall forming wall sections 23, 24, formed arcuately to inscribe the rectangular upper and lower cartridge halves 2, 3, the partitioning wall section 22 encircles substantially the entire periphery of the magnetic disc 5 housed in the disc housing section 21.

At a center portion of the lower cartridge half 3, constituting the lower surface of the main cartridge body unit 4, there is formed a circular center opening 25 for allowing the swollen-out portion 9 of the center core 8 mounted on the magnetic disc 5 housed within the main cartridge body unit 4 to be exposed to outside, as shown in FIGS. 2 and 3. The center opening 25 is a provided only on the lower cartridge half 3, while the center portion of the upper surface of the main cartridge body unit 2 constituted by the upper cartridge half 2 remains solid, as shown in FIGS. 1 and 3.

In the registering portions of the upper cartridge half 2 constituting the upper surface of the main cartridge body unit 4 and the lower cartridge half 3, there are formed a first recording/reproducing aperture 26 and a second recording/reproducing aperture 27 for allowing at least a portion of the signal recording region of the magnetic disc housed in the main cartridge body unit 4 to be exposed to outside across the radial direction of the magnetic disc 5. These recording/reproducing apertures 26, 27 are substantially rectangular in shape and extend from the center portion in the vicinity of the center opening 25 in the left-and-right direction of the main cartridge body unit 4 to the vicinity of the front wall section 15 of the main cartridge body unit 4. The first and second recording/reproducing apertures 26, 27 are formed from the disc housing section 21 to the position proximate to the front wall section 15 so that the magnetic head constituting the recording/reproducing means for information signals, intruded into the inside of the main cartridge body unit 4, will scan the magnetic disc 5 housed in the main cartridge body unit 4 via these openings 26, 27 as far as the outer rim of the magnetic disc 5 housed in the main cartridge body unit 4, as shown in FIGS. 5 and 6.

Figure 8:
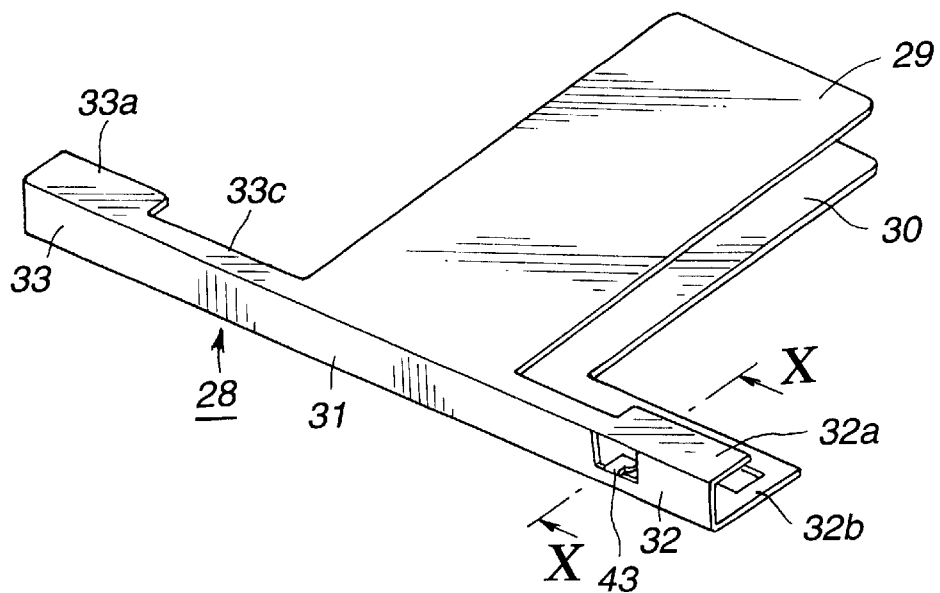
FIG. 8 is a perspective view showing the first shutter portion of the shutter member used in the disc cartridge of the present invention.
Figure 9:
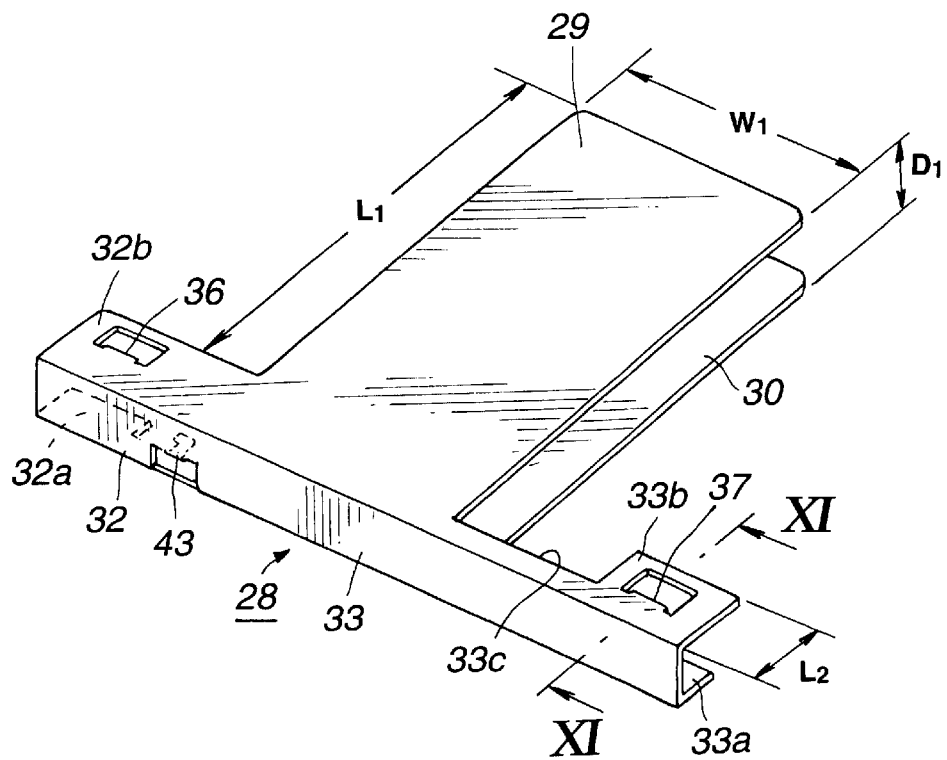
FIG. 9 is a perspective view showing the second shutter portion of the shutter member shown in FIG. 8.

On the main cartridge body unit 4, there is movably mounted a shutter member 28 for opening/closing the first and second recording/reproducing apertures 26, 27, as shown in FIGS. 1 and 2. The shutter member 28, formed by punching and bending a thin metal sheet, such as a stainless steel sheet, includes a first shutter portion 29 for opening/closing the first recording/reproducing aperture 26 formed in the upper surface of the main cartridge body unit 4, a second shutter portion 30 for opening/closing the second recording/reproducing aperture 27 formed in the lower surface of the main cartridge body unit 4, and a connecting plate 31 for connecting the proximal ends of the first and second shutter portions 29, 30 so that the first and second shutter portions 29, 30 will be approximately parallel to each other, as shown in FIGS. 8 and 9. The connecting plate 31 is formed for being protruded on both sides of the first and second shutter portions 29, 30 for extending along the direction of the first sidewall section 15 of the main cartridge body unit 4 when the shutter member 28 is mounted on the main cartridge body unit 4. It is on this protruded portion that first and second cartridge holding portions 32, 33 are mounted. These cartridge holding portions 32, 33 are formed in a U-shaped cross-section so as to have a fit on the first sidewall section 15 of the main cartridge body unit 4, as shown in FIGS. 1 and 2, by forming paired lugs 32a, 32b, 33a, 33b protruded in the direction of extension of the first and second shutter portions 29, 30 on facing lateral edges of the connecting plate 31 carrying the first and second shutter portions 29, 30, as shown in FIGS. 8 and 9. The first and second cartridge holding portions 32, 33 are formed with a protrusion length L2, sufficient to have a fit on the first sidewall section 15 of the main cartridge body unit 4, and which is sufficiently shorter than the length L1 of the first and second shutter portions 29, 30, as shown in FIGS. 8 and 9. That is, the shutter member 28 has the first and second shutter portions 29, 30 of a width W1 sufficient to close the recording/reproducing apertures 26, 27, and the first and second cartridge holding portions 32, 33 protruded on both sides of the first and second shutter portions 29, 30, with the shutter member 28 being substantially of the tee shape, as shown in FIGS. 8 and 9.

The lugs 33a, 33b of the second cartridge holding portion 33 of the shutter member 28 are formed with cut-out recesses 33c which, when the shutter member 28 is moved to the position of opening the first and second recording/reproducing apertures 26, 27, formed up to the vicinity of the first sidewall section 15 of the main cartridge body unit 4, operate for opening the portions of the apertures 26, 27 lying towards the first sidewall section 15.

Figure 10:
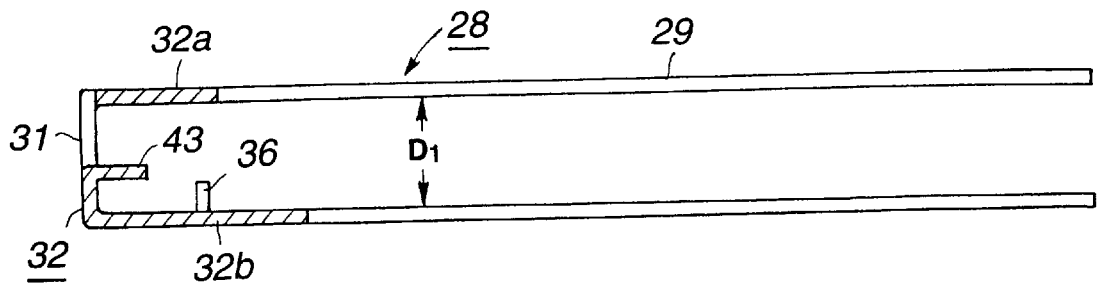
FIG. 10 is a cross-sectional view taken along line X—X in FIG. 8.
Figure 11:
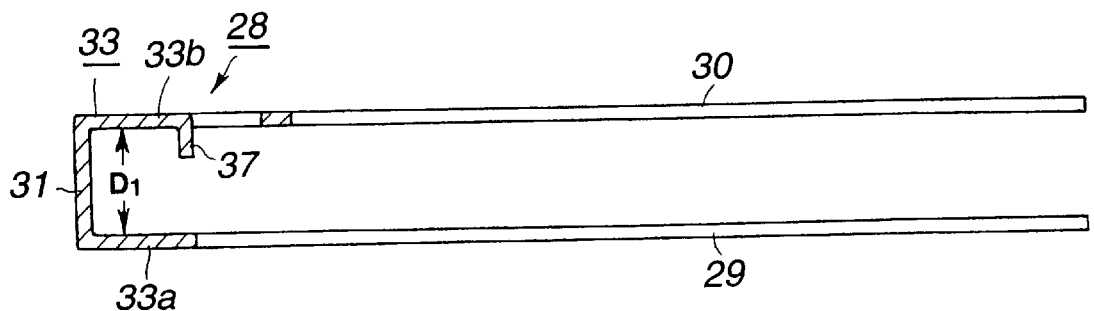
FIG. 11 is a cross-sectional view taken along line IX—IX in FIG. 9.

The lugs 32b, 33b, constituting the first and second cartridge holding portions 32, 33, and which are protruded towards the second shutter portion 30, are formed with first and second guide pieces 36, 37, respectively for engaging with first and second movement guide grooves 34, 35 formed in the lower surface of the main cartridge body unit 4 for extending along the first sidewall section 15 of the main cartridge body unit 4, on both sides of the second recording/reproducing aperture 27, as shown in FIGS. 10 and 11. These guide pieces 36, 37 are bent towards the second shutter portion 30 at right angles to the second shutter portion 30.

The first and second movement guide grooves 34, 35, in which are engaged the first and second guide pieces 36, 37, are formed on both sides of the first sidewall section 15 of the main cartridge body unit 4 offset from the disc housing section 21 housing the magnetic disc 5, as shown in FIG. 2. These movement guide grooves 34, 35 are provided by having portions of the lower cartridge half 3 swollen out towards the inner side of the main cartridge body unit 4, as shown in FIGS. 3 and 6, and act for reducing the spacing within the main cartridge body unit 4. However, since the movement guide grooves 34, 35 are provided at the positions offset from the disc housing section 21, the spacing within the disc housing section 21 is not reduced, while rotation of the magnetic disc is not obstructed.

The connecting plate 31 constituting the first cartridge holding portion 33 is formed with a spring retainer 43 for retaining an end of a torsion coil spring 42 arranged in the main cartridge body unit 4 for biasing the shutter member 28 mounted on the main cartridge body unit 4 in a direction of closing the first and second recording/reproducing apertures 26, 27. This spring retainer 43 is mounted parallel to the direction of extension of the first and second shutter portions 29, 30.

Referring to FIGS. 1 and 2, the shutter member 28, constructed as described above, is mounted on the main cartridge body unit 4, by inserting the first and second shutter portions 29, 30 onto the main cartridge body unit 4 from the first sidewall section 15 so that the first and second shutter portions 29, 30 will be extended over the first and second recording/reproducing apertures 26, 27, the first and second cartridge holding portions 32, 33 are fitted on the first sidewall section 15 of the main cartridge body unit 4 and the paired guide pieces 36, 37 are engaged in the movement guide grooves 34, 35. The shutter member 28, thus mounted on the main cartridge body unit 4, has the guide pieces 36, 37 guided by the movement guide grooves 34, 35 and is moved in this manner in the direction indicated by arrows A and B in FIGS. 1 and 2 between a position in which the first and second shutter portions 29, 30 close the first and second recording/reproducing apertures 26, 27, respectively, and a position in which the first and second shutter portions 29, 30 open the first and second recording/reproducing apertures 26, 27, respectively.

In the upper and lower surfaces of the main cartridge body unit 4, there are formed shutter movement recesses 38, 39 for extending from the rims of the first and second recording/reproducing apertures 26, 27 to the third sidewall section 17 of the main cartridge body unit 4, as shown in FIGS. 1 and 2. In the front wall section 15 of the main cartridge body unit 4, there is formed a movement recess 40, corresponding in thickness to the connecting plate 31, for extending along the range of movement of the shutter member 28. The shutter member 28 is mounted substantially flush with the peripheral surface of the main cartridge body unit 4, by having the first and second shutter portions 29, 30 extended within the shutter movement recesses 38, 39 and by having the connecting plate 31 positioned within the movement recess 40.

The side of the first sidewall section 15 of the main cartridge body unit 4, along which is moved the shutter member 28, is formed with a shutter opening member accommodating recess 41. This recess 41 is formed at a lower level than the movement recess 40.

The shutter member 28, mounted on the main cartridge body unit 4 without protruding the first and second shutter portions 29, 30 from the upper and lower surfaces of the main cartridge body unit 4, is configured so that a distance D1 between the first and second shutter portions 29, 30 will be approximately equal to the thickness D2 of the portion of the main cartridge body unit 4 formed with the shutter movement recesses 38, 39. Moreover, the first and second cartridge holding portions 32, 33 of the U-shaped cross-section, adapted to have a fit on the first sidewall section 15 of the main cartridge body unit 4, are configured so that the distance between the lugs 32a, 32b of the first cartridge holder 32 and that between the lugs 33a, 33b of the cartridge holder 33 will be equal to D1 approximately equal to the thickness D2 of the portion of the main cartridge body unit 4 formed with the shutter movement recesses 38, 39.

The shutter member 28, movably mounted on the main cartridge body unit 4, is biased by the torsion coil spring 42, as a biasing member arranged within the main cartridge body unit 4, in a direction of closing the first and second recording/reproducing apertures 26, 27, indicated by arrow B in FIGS. 1 and 2. The torsion coil spring 42 is arranged at a corner of the main cartridge body unit 4 where the shutter member 28 is positioned when the shutter member 28 has opened the first and second recording/reproducing apertures 26, 27. This torsion coil spring 42 has its one end and its other end retained by a spring retention portion provided in the main cartridge body unit 4 and by a spring retainer 43 provided in the first cartridge holder 32, respectively, for biasing the shutter member 28 in the direction of closing the first and second recording/reproducing apertures 26, 27, as indicated by arrow B in FIGS. 1 and 2.

In the first sidewall section 15 of the main cartridge body unit 4 is formed a spring inserting opening 44 for inserting the torsion coil spring 42 biasing the shutter member 28 into the inside of the main cartridge body unit 4. This spring inserting opening 44 is formed by providing cut-outs 19a, 20a in the portions of the upstanding wall sections 19, 20 formed in the upper and lower cartridge halves 2, 3 for constituting the first sidewall section 15 of the main cartridge body unit 4, as shown in FIGS. 5 and 6.

At a mid portion on the inner surface of the upper cartridge half 2 constituting the main cartridge body unit 4 is protuberantly formed a disc movement inhibiting rib 45 adapted for inhibiting movement of the magnetic disc 5, as shown in FIG. 7. This disc movement inhibiting rib 45 is circular in shape with an outer diameter sufficient to be intruded into the swollen-out portion 9 of the center core 8 provided on the magnetic disc 5. This disc movement inhibiting rib 45 is intruded into the swollen-out portion 9, as shown in FIG. 7, to inhibit movement of the magnetic disc 5 in the planar direction to prevent the outer rim of the magnetic disc 5 from being deformed due to abutment against the partitioning wall section 22 to protect the flexible magnetic disc 5.

Also, the disc movement inhibiting rib 45 is abutted against the bottom 9a of the swollen-out portion 9 of the center core 8, when the magnetic disc 5 is moved towards the upper cartridge half 2, to prevent the flange 10 of the center core 8 positioned on the upper surface of the main disc member 6 from contacting with the inner surface of the upper cartridge half 2 as well as to prevent the upper cartridge half 2 of synthetic resin from being scraped by the metal center core 8 to inhibit chips from being produced.

On the outer periphery of the disc movement inhibiting rib 45 is formed an annular recess 46, into which is intruded the flange 10 of the center core 8 when the magnetic disc 5 is supported by the disc movement inhibiting rib 45, as shown in FIG. 7. Thus, by forming the annular recess 46 in this manner, the flange 10 can be prevented from contacting with the inner surface of the upper cartridge half 2 as the main cartridge body unit 4 is reduced in thickness.

On the inner surface of the upper cartridge half 2, there is protuberantly formed a ring-shaped rib 48, constituting a protective sheet mounting portion 47, along with the partitioning wall forming wall section 23, for surrounding the annular recess 46. The protective sheet mounting portion 47, surrounded by the partitioning wall forming wall section 23 and the rib 48, has a planar surface, and carries a protective sheet 49, constituted by a non-woven cloth or a lubricious sheet, such as a felt sheet, for protecting the magnetic disc 5. The protective sheet 49 has its entire surface or a portion thereof bonded to the protective sheet mounting portion 47 by thermal fusion, ultrasonic welding or with an adhesive.

The protective sheet 49 has a cut-out 49a, in register with the first recording/reproducing aperture 26, for opening this aperture, as shown in FIG. 5.

The inner surface of a protective sheet mounting portion 50, which is an area of the lower cartridge half 3 surrounded by the partitioning wall forming wall section 24, is also a planar surface, and carries a protective sheet 51 which, similarly to the protective sheet 49 arranged on the upper cartridge half 2, is a non-woven cloth, such as a felt cloth, or a lubricious sheet, having a cut-out 51a in register with the second recording/reproducing aperture 27. This protective sheet 51 has its entire surface or a portion thereof bonded to the protective sheet mounting portion 50 of the lower cartridge half 3, by thermal fusion, ultrasonic welding or with an adhesive, as shown in FIG. 6.

Figure 12:
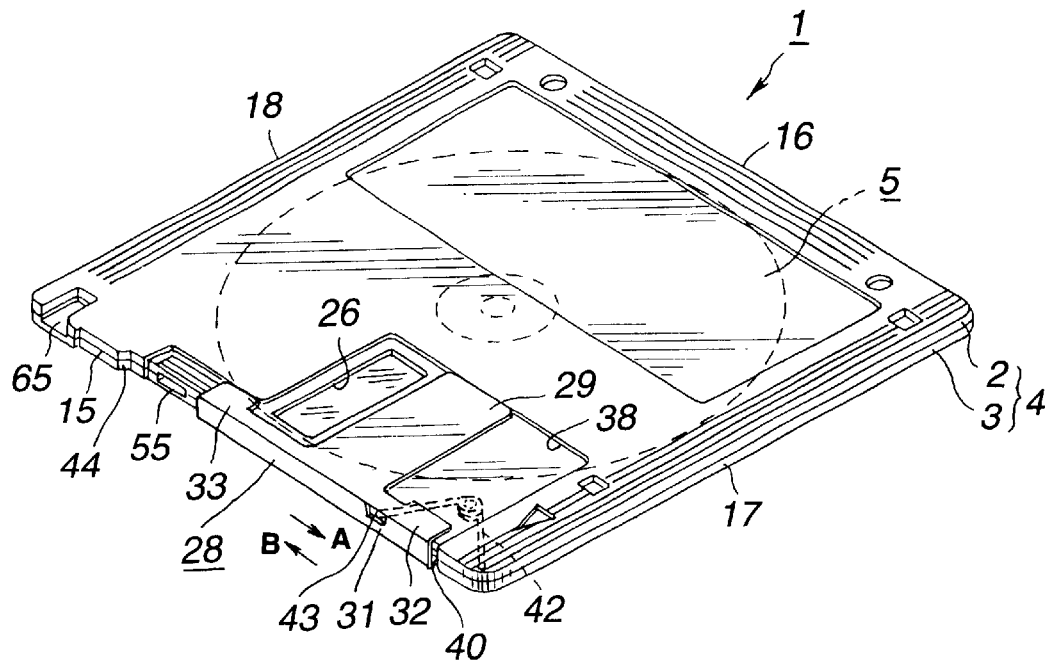
FIG. 12 is a perspective view of a disc cartridge in which the shutter member has been moved to the position of opening the first and second recording/reproducing apertures.

Meanwhile, the main cartridge body unit 4 is formed with an air exhaust opening 55 for exhausting air in the disc housing section 21 as a spacing surrounded by the partitioning wall section 22 to outside the main cartridge body unit 4, and an air exhaust passage 56 communicating with the air exhaust opening 55. Referring to FIG. 12, the air exhaust opening 55 is formed by partially segmenting the front wall section 15 of the main cartridge body unit 4. The air exhaust opening 55 is provided at a position in which the opening 55 is closed by a portion of the shutter member 28 when the shutter member 28 is at the position of closing the first and second recording/reproducing apertures 26, 27, as shown in FIGS. 1 and 2, and in which the opening 55 is opened when the shutter member 28 is moved to the position of opening the first and second recording/reproducing apertures 26, 27 as shown in FIG. 12.

That is, the air exhaust opening 55 is provided at such a position in which, when the shutter member 28 is at the position of closing the first and second recording/reproducing apertures 26, 27, as shown in FIGS. 1 and 2, the air exhaust opening 55 is closed by the second cartridge holding portion 33 projected laterally of the first and second recording/reproducing apertures 26, 27, with the air exhaust opening 55 being on the opposite side to the torsion coil spring 42 with the shutter member 28 in-between. The torsion coil spring 43 is adapted to bias the shutter member 28 in a direction of closing the first and second recording/reproducing apertures 26, 27, as mentioned previously.

The air exhaust opening 55 is formed by forming registering cut-outs 55a, 55b in portions of the upstanding wall sections 19, 20 of the upper and lower cartridge halves 2, 3 constituting the front wall section 15 of the main cartridge body unit 4, and by abutting the upstanding wall sections 19, 20 to each other, as shown in FIGS. 5 and 6. Since the air exhaust opening 55 is provided at a position such that, when the shutter member 28 is at a position of closing the first and second recording/reproducing apertures 26, 27, as shown in FIGS. 1 and 2, the air exhaust opening 55 is closed by a portion of the shutter member 28, it is possible to prevent dust and dirt from intruding into the inside of the main cartridge body unit 4 via the air exhaust opening 55 when the disc cartridge 1 is not loaded on the recording and/or reproducing apparatus, such as when the disc cartridge 1 is laid in store.

The air exhaust passage 56, configured for establishing communication between the disc housing section 21 and the air exhaust opening 55 for conducting air from within the disc housing section 21 towards the air exhaust opening 55, is formed by providing cut-outs 23a, 24a in portions of the partitioning wall forming wall sections 23, 24 making up the partitioning wall section 22 delimiting the disc housing section 21, as shown in FIGS. 5 and 6. These cut-outs 23a, 24a are formed in the portions of the partitioning wall section 22 facing the air exhaust opening 55 of the partitioning wall section 22. On one side of the air exhaust passage 56 extending from the partitioning wall section 22 to the air exhaust opening 55 is formed an air stream guide wall section 57 adapted to guide air flowing from the disc housing section 21 to the air exhaust opening 55, as shown in FIGS. 5 and 6.

By providing the air exhaust opening 55 and the air exhaust passage 56 in this manner, it is possible to discharge dust and dirt in the main cartridge body unit 4 to outside by an air stream produced by the magnetic disc 5 being run in rotation within the main cartridge body unit 4.

In the lower surface of the main cartridge body unit 4 constituting the disc cartridge 1 according to the present invention, there are bored first and second positioning reference holes 59, 60, engaged by positioning pins provided on the disc recording/reproducing apparatus for setting the loading position of the disc cartridge 1, as shown in FIG. 2. These positioning reference holes 59, 60 are provided in the lower surface of the main cartridge body unit 4 towards the first sidewall section 15 on both sides relative to the movement direction of the shutter member 28. The first positioning reference hole 59 is circular in conformity to the positioning pin circular in cross-section, while the second positioning reference hole 60 is elliptically-shaped, with the movement direction of the shutter member 28 as a long axis, in order to permit correction of the engagement position with respect to the positioning pin.

At a corner of the second sidewall section 16, on the lower surface of the main cartridge body unit 4, a mistaken recording inhibiting member 61 is mounted for movement, as shown in FIG. 2. This mistaken recording inhibiting member 61 opens/closes a mistaken recording inhibiting hole 62 bored in the main cartridge body unit 4 to select a state enabling information signals to be recorded on the magnetic disc 5 or a state inhibiting the recording of the information signals.

On the opposite side corner of the second sidewall section 16 and in the vicinity of the first positioning reference hole 59 in the lower surface of the main cartridge body unit 4, there are formed first and second recording capacity discriminating holes 63, 64, for indicating the recording capacity of the magnetic disc 5 housed in the disc cartridge 1, as shown in FIG. 2.

On the opposite side corner towards the first sidewall section 15 in the upper surface of the main cartridge body unit 4, there is provided a loading controlling portion 65 for inhibiting loading of the disc cartridge 1 of the present invention housing the magnetic disc 5 on a disc recording/reproducing apparatus employing a disc cartridge housing a magnetic disc having a recording capacity different from the magnetic disc 5. The loading controlling portion 65 is formed as a recess opening on the first sidewall section 15.

On the corners of the inner surfaces of the upper and lower cartridge halves 2, 3 making up the main cartridge body unit 4, there are provided welding projections 66, 67 abutted and engaged with one another, as shown in FIGS. 5 and 6. The upper and lower cartridge halves 2, 3 constitute the main cartridge body unit 4 by abutting the welding projections 66, 67 and the upstanding wall sections 19, 20 and by welding the welding projections 66, 67, thus abutted together, using e.g., ultrasonic waves.

When the disc cartridge 1, constructed as described above, is loaded on a disc recording/reproducing apparatus, employing the disc cartridge 1 as the recording medium, the first and second positioning reference holes 59, 60 are engaged by the positioning pins provided on the disc recording/reproducing apparatus for positioning in the horizontal direction, while the corners of the second sidewall section 16 of the main cartridge body unit 4 are supported by the height setting pins to set the loading height setting position.

When the disc cartridge 1 is loaded on the disc recording/reproducing apparatus, the shutter member 28 is moved by the shutter opening mechanism provided on the disc recording/reproducing apparatus, against the bias of the torsion coil spring 42, in the direction indicated by arrow A in FIGS. 1 and 2, for opening the first and second recording/reproducing apertures 26, 27. At this time, the air exhaust opening 55, provided in the first sidewall section 15 of the main cartridge body unit 4, is also opened, as shown in FIG. 12.

Figure 13:
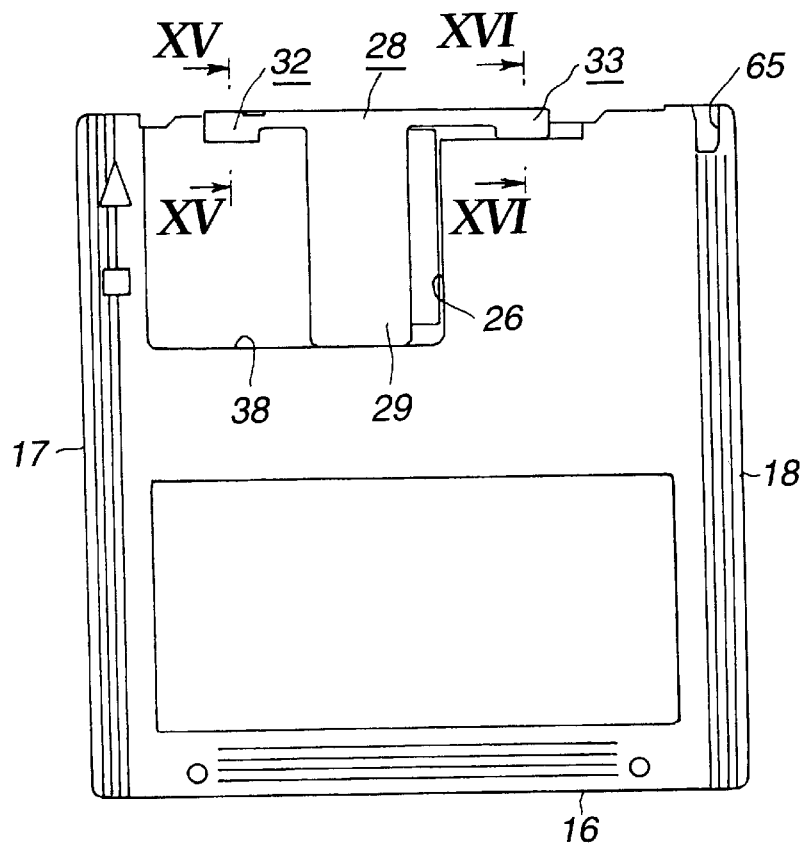
FIG. 13 is a plan view of the disc cartridge showing the state in which the shutter member is mounted on the main cartridge body unit.
Figure 14:
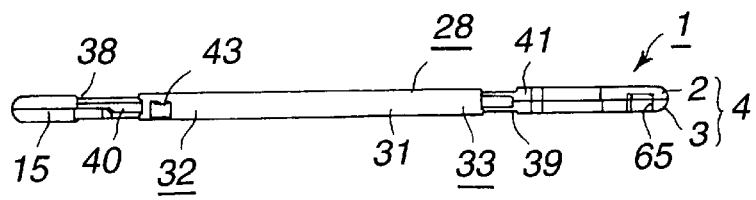
FIG. 14 is a front view of the disc cartridge showing the state in which the shutter member is mounted on the main cartridge body unit.

When the shutter member 28, mounted on the above-described disc cartridge 1, is mounted on the main cartridge body unit 4, it is fitted on the upper and lower surfaces of the main cartridge body unit 4, in such a state in which one sides of the first and second shutter portions 29, 30 are spaced apart from the upstanding sides of the shutter movement recesses 38, 39 to slightly open the first and second recording/reproducing apertures 26, 27, as shown in FIGS. 13 and 14, in order to prevent the sides of the first and second shutter portions 29, 30 from coming into sliding contact with the upstanding sides of the shutter movement recesses 38, 39 to produce chips.

The shutter member 28 is provided with the guide pieces 36, 37 engaging in the first and second movement guide grooves 34, 35 formed in the lower cartridge half 3 constituting the lower surface of the main cartridge body unit 4, as mentioned previously. These guide pieces 36, 37 are formed by bending portions of the lugs 32b, 33b of the first and second cartridge holding portions 32, 33, spaced apart from each other by a distance D1 approximately equal to the distance D2 of the portions of the main cartridge body unit 4 provided with the shutter movement recesses 38, 39, towards the lugs 32a, 33a, that is towards the first shutter portion 29. Thus, the distance between the distal ends of the guide pieces 36, 37 and the lugs 32a, 33a is smaller than the thickness D2 of the main cartridge body unit 4.

Figure 15:
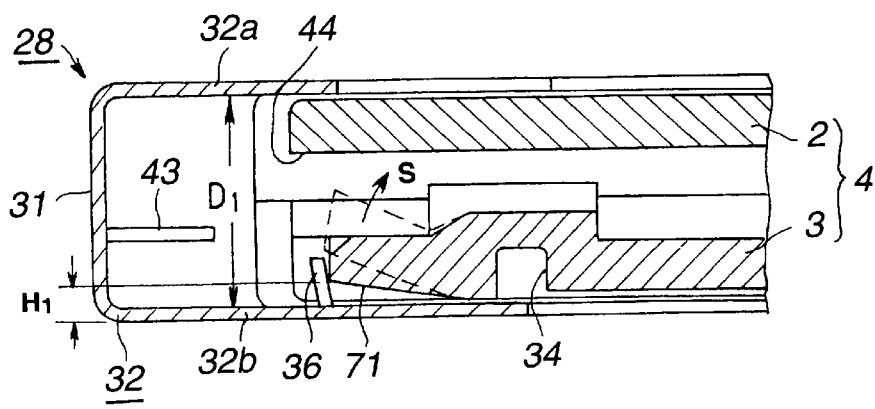
FIG. 15 is a cross-sectional view taken along line XV—XV of FIG. 14 showing a first engaging piece and the first inclined guide surface side in a state in which the shutter member is mounted on the main cartridge body unit.
Figure 16:
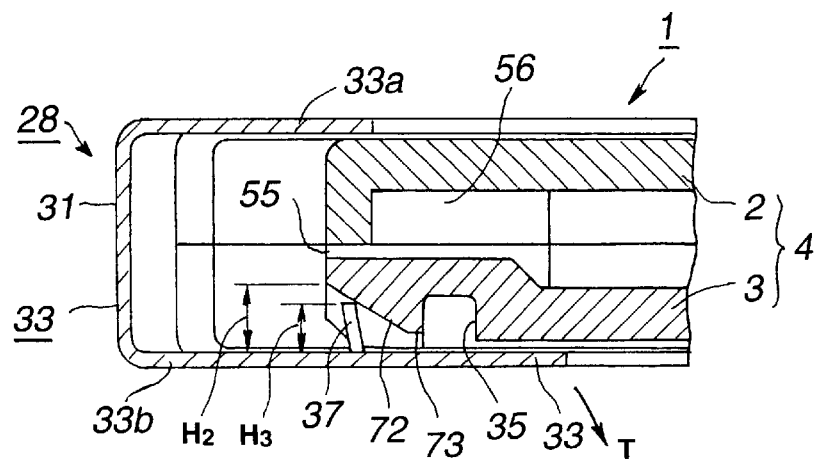
FIG. 16 is a cross-sectional view taken along line XVI—XVI of FIG. 14 showing a second engaging piece and the second inclined guide surface side in a state in which the shutter member is mounted on the main cartridge body unit.

If the shutter member 28, configured as described above, is fitted to the main cartridge body unit 4, the first and second guide pieces 36, 37 are abutted against the first sidewall section 15 of the main cartridge body unit 4. In order to avoid collision of the first and second guide pieces 36, 37 against the main cartridge body unit 4 and to permit the guide pieces 36, 37 to be smoothly engaged in the first and second movement guide grooves 34, 35, the first sidewall section 15 of the main cartridge body unit 4 is provided with first and second inclined guide portions 71, 72, as shown in FIGS. 15 and 16. These first and second inclined guide portions 71, 72 are provided for facing the first and second guide pieces 36, 37, respectively, when the shutter member 28 is introduced into the inside of the main cartridge body unit 4 in the slightly opened state of the first and second recording/reproducing apertures 26, 27, as shown in FIGS. 13 and 14.

Since the first and second inclined guide portions 71, 72 are adapted to guide the first and second guide pieces 36, 37 smoothly into engagement with the first and second movement guide grooves 34, 35, the inclined guide portions 71, 72 are formed on the lower cartridge half 3 constituting the lower surface of the main cartridge body unit 4 formed with the first and second movement guide grooves 34,35 for extending from the vicinity of the upstanding portions of the first and second movement guide grooves 34, 35 up to the first sidewall section 15, as shown in FIGS. 15 and 16.

The first inclined guide groove 71, adapted to guide the first guide piece 36 in the first movement guide groove 34, is formed in the portion of the main cartridge body unit 4 provided with the spring inserting opening 44. This spring inserting opening 44 is provided by forming cut-outs 19a, 20a in the portions of the upstanding wall sections 19, 20 constituting the first sidewall section 15 so that the spring inserting opening 44 will have a larger width and a larger height to permit insertion therein of the torsion coil spring 42. Therefore, the portions of the upper and lower cartridge halves 2, 3 facing the spring inserting opening 44 are configured for being flexed and deformed in a direction approaching to each other. The first inclined guide portion 71 for guiding the engagement of the first guide piece 36 into the first movement guide groove 34 is of a height Hi sufficient to evade the first guide piece 36 from being abutted against the first sidewall section 15 when the distal end of the first sidewall section 15 of the lower cartridge half 3 is flexed towards the upper cartridge half 2, as shown by a broken line in FIG. 15.

The second inclined guide portion 72, adapted for guiding the engagement of the second guide piece 37 into the second movement guide groove 35, is formed in the vicinity of the air exhaust opening 55 of a small gap width, that is, in a site in which it is difficult to reduce the thickness D2 of the main cartridge body unit 4. Thus, the second inclined guide portion 72 is formed so as to have a height H2 sufficient to evade the second guide piece 37 from being abutted against the first sidewall section 15 when the shutter member 28 has a fit on the first sidewall section 15 of the main cartridge body unit 4, as shown in FIG. 16. That is, the second inclined guide portion 72 has a height H2 from the lower surface of the main cartridge body unit 4 larger than the height H3 of the second guide piece 37.

In an upstanding portion of the second movement guide groove 35, provided in a site in which it is difficult to flex the main cartridge body unit 4, there is formed a cut-out step 73 lower in level than the opposite side upstanding portion. The role of this cut-out step 73 is to assure facilitated engagement of the second guide piece 37 in the second movement guide groove 35.

For mounting the shutter member 28 on the main cartridge body unit 4, provided with the first and second movement guide portions 71, 72, as described above, the shutter member 28 is fitted from the side of the first sidewall section 15 of the main cartridge body unit 4, with the first and second recording/reproducing apertures 26, 27 in a slightly opened state, as shown in FIGS. 13 and 14. At this time, the first engagement piece 36 is abutted against the first sidewall section 15 of the main cartridge body unit 4. However, the first engagement piece 36 causes the distal end of the lower cartridge half 3 to be flexed in the direction indicated by arrow S in FIG. 15 so that the first engagement piece 36 rides on the first inclined surface 71. The second engagement piece 37 is kept in a state of riding on the second inclined guide portion 72 having a height H2 larger than the height H3 of the engagement piece 37.

Figure 17:
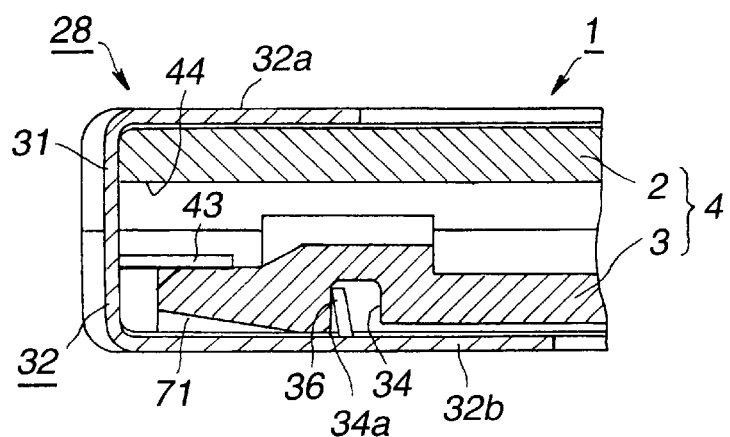
FIG. 17 is a cross-sectional view of the disc cartridge showing the state in which the first engagement piece is engaged in a first movement guide groove.
Figure 18:
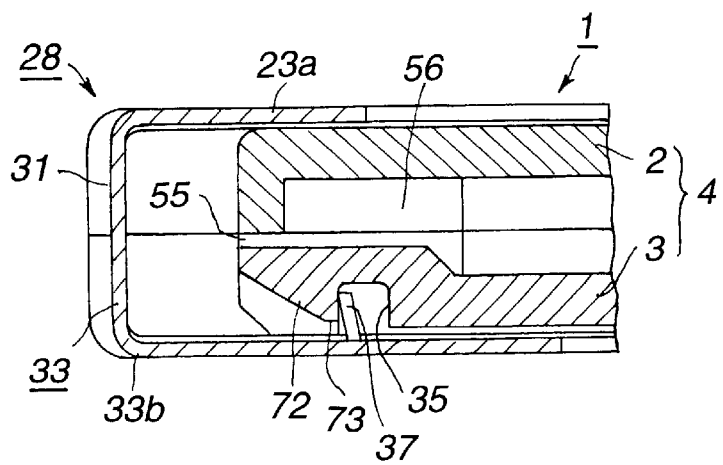
FIG. 18 is a cross-sectional view of the disc cartridge showing the state in which the second engagement piece is engaged in a second movement guide groove.

If the shutter member 28 is thrust into the inside of the main cartridge body unit 4, the first and second guide pieces 36, 37 are moved in sliding contact with the first and second movement guide portions 71, 72 into engagement with the first and second movement guide grooves 34, 35, as shown in FIGS. 17 and 18. By flexing the portion of the lower cartridge half 3 formed with the first inclined surface 71 in the direction indicated by arrow S in FIG. 15, the first engagement piece 36 is moved on the first inclined surface 71 into engagement with the first movement guide portion 34, without coming into sliding contact with the first inclined surface 71 with a larger force, thus suppressing the amount of chips otherwise produced by sliding contact between the first engagement piece 36 and the first inclined surface 71.

By fitting the shutter member 28 on the main cartridge body unit 4, with the lug 33b of the second cartridge holding portion 33, carrying the second engagement piece 37, being flexed in the direction indicated by arrow T in FIG. 16 corresponding to the direction separating from the lower surface of the main cartridge body unit 4, the second engagement piece 37 can be evaded from coming into sliding contact with the second inclined guide portion 71 to suppress the amount of chips otherwise produced due to sliding contact between the first guide piece 37 and the first inclined surface 71. In this case, a small amount of flexure of the lug 33b of the second cartridge holding portion 33 in the direction indicated by arrow T in FIG. 16 suffices to prevent the second cartridge holding portion 33 from being deformed. In particular, the since the cut-out recess 73 is formed in one of the upstanding portions of the second movement guide groove 35, the first guide piece 37 can ride over the upstanding portion of the second movement guide groove 35 so as to be engaged easily in the second movement guide groove 35, even if the amount of displacement of the other ly 33b is reduced further.

The shutter member 28, having the first and second guide pieces 36,37 engaged in the first and second movement guide grooves 34, 35, is prevented from being detached from the main cartridge body unit 4, and is mounted for movement in the direction indicated by arrows A and B in FIGS. 1 and 2 for opening/closing the first and second recording/reproducing apertures 26, 27 along the first sidewall section 15 of the main cartridge body unit 4.

The shutter member 28, movably mounted on the main cartridge body unit 4, is biased into movement in the direction indicated by arrow B in FIGS. 1 and 2 for closing the first and second recording/reproducing apertures 26, 27 by the torsion coil spring 42 inserted into the main cartridge body unit 4 via the spring inserting opening 44.

In the disc cartridge 1, in which the first inclined guide portion 71, formed in the readily flexible portion of the main cartridge body unit 4, has a small angle of inclination and a reduced height, the readily flexible portion of the main cartridge body unit 4 can be increased in thickness and have sufficient strength, as a result of which large flexure and deformation can be realized positively.

In the above-described embodiment, the first and second inclined guide portions 71, 72 are of different inclination angles, with only the second inclined guide portion 72 being larger in height than the second engagement piece, it is also possible for the first inclined guide portion 71 to have the same angle of inclination as the second inclined guide portion 72 and to be larger in height than the second inclined guide portion 72.

The present invention may be applied not only to the disc cartridge housing the above-described magnetic disc, but also any disc cartridge housing a disc-shaped recording medium, such as a an optical disc or a magneto-optical disc, provided with a shutter member mounted on the main cartridge body unit, by having the guide piece engaged in the movement guide groove provided in the upper or lower surface of the main cartridge body unit, with a merit comparable to that obtained with the above-described disc cartridge.

With the disc cartridge 1 of the present invention, in which the inclined guide portions 71, 72, adapted for guiding the guide pieces 36, 37 operating as engagement pieces provided on the shutter member 28, in engagement with the movement guide grooves 34, 35 provided on the main cartridge body unit 4, are of a height larger than the height of the guide pieces 36, 37, the guide pieces 36, 37 may be prevented from coming into sliding contact with the inclined guide portions 71, 72 with a large force to produce a large amount of chips to prohibit the chips from becoming affixed to the magnetic disc 5, as the disc-shaped recording medium accommodated in the main cartridge body unit 4, to assure reliable protection of the magnetic disc 5.

Also, when mounting the shutter member 28 on the main cartridge body unit 4, ti is possible to prevent the main cartridge body unit 4 from becoming severely damaged to maintain optimum appearance of the main cartridge body unit 4.

Moreover, since it is unnecessary to deform the shutter member 28 significantly when mounting the shutter member 28 on the main cartridge body unit 4, such disc cartridge may be provided in which the shutter member 28 can be protected to assure reliable opening/closure of the recording and/or reproducing apertures 26, 27.

What is claimed is:

1. A disc cartridge for rotationally housing a disc-shaped recording medium as an information recording medium, comprising:

a disc-shaped recording medium;

a main cartridge body unit including an upper cartridge half and a lower cartridge half rotationally housing said disc-shaped recording medium, said main cartridge body unit including a recording and/or reproducing aperture in at least the upper cartridge half or the lower cartridge half thereof for exposing at least a portion of said disc-shaped recording medium to outside along a radial direction of said disc-shaped recording medium;

a shutter member having a shutter portion for opening/closing said recording and/or reproducing aperture, said shutter member being mounted on said main cartridge body unit for movement along a lateral side of said main cartridge body unit;

said shutter member further comprising a cartridge holding portion, wherein said cartridge holding portion is comprised of an upper lug adjacent and substantially parallel to at least a portion of said upper cartridge half, a lower lug adjacent and substantially parallel to said lower cartridge half, and a connecting plate;

said shutter member having at least a first guide piece and a second guide piece extending substantially perpendicularly from said upper or said lower lug at a predetermined height, wherein said first and second guide pieces operate, as a pair, for engagement in movement guide grooves formed in at least one of the upper or lower cartridge half of said main cartridge body unit for extending along the direction of movement of said shutter member;

there being formed a first inclined guide portion and a second inclined guide portion on a distal and lateral side of said main upper cartridge half or lower cartridge half for guiding the first guide piece and the second guide piece into engagement with the movement guide groove;

said first inclined guide portion or the second inclined guide portion being higher in height than the first or second guide piece facing said first inclined guide portion or said second inclined guide portion, respectively, wherein the height of an inclined guide portion is defined as the perpendicular distance from the upper lug to a most distal end said lateral side of the upper cartridge half or the perpendicular distance from the lower lug to a most distal end of said lateral side of the lower cartridge half.

2. The disc cartridge according to claim 1 wherein the first inclined guide portion and the second inclined guide portion are formed for extending from a lateral side of said main cartridge body unit to one side of said movement guide groove or to the vicinity thereof with different angles of inclination, with the first or second inclined guide portion having a larger angle of inclination than that of the second or first inclined guide portion being of a height larger than the second or first guide piece facing said second or first guide piece, respectively.

3. The disc cartridge according to claim 2 wherein there is provided a gap between the portions of said upper and lower cartridge halves formed with the first or second inclined guide portion having an angle of inclination smaller than the second or first inclined guide portion on one lateral side of the main cartridge body unit.

4. The disc cartridge according to claim 2 wherein a side of the first or second inclined guide portion having a larger inclination angle than the second or first inclined guide portion, facing the second or the first inclined guide portion, has a height lower than the other side thereof.

5. The disc cartridge according to claim 1 wherein said first and second guide pieces are protuberantly formed laterally of the movement direction of the shutter portion and are formed on the cartridge holding portion fitted on the lateral side of said main cartridge body unit.

* * * * *